United States Patent Office 3,419,660
Patented Dec. 31, 1968

3,419,660
INOCULANT FOR CATTLE OR THE LIKE
John P. Lannon, 3400 3rd St.,
Columbus, Nebr. 68601
No Drawing. Continuation-in-part of application Ser. No. 372,412, June 3, 1964. This application Nov. 30, 1966, Ser. No. 597,886
1 Claim. (Cl. 424—92)

This is a continuation-in-part of the application, Ser. No. 372,412, filed June 3, 1964, now abandoned.

It has been discovered that cattle quite frequently become sick after they have been moved from a range area to feed lots or different grazing areas. The cattle often develop respiratory infections soon after the moving operation as a result of the movement, stress and exposure caused thereby. These infections are sometimes fatal and almost always result in poor weight gains. The infections also require that the sick animals be sorted out of the herd for individual treatment, and this interfers with bringing the herd to the full feed level.

Therefore, it is the principal object of this invention to provide an inoculation for cattle which destroys bacterial infection that they might be infected with or incubating through exposure, helps overcome the stress of movement and starting on feed and aids in the prevention of respiratory infections throughout the feeding period.

A further object of this invention is to provide an inoculant for cattle which prevents the cattle from becoming sick due to their being moved from a range area to feed lots or different grazing areas.

A further object of this invention is to provide an inoculant for cattle which prevents and combats infections caused by stress, movement and exposure.

A further object of this invention is to provide an inoculation that can be given during a time of stress without greatly adding to the already present stressed condition.

A further object of this invention is to provide an inoculant which may be conveniently given to the animal with a minimum of restraint to said animal.

A further object of this invention is to provide an inoculant for cattle which may be conveniently given.

A further object of this invention is to provide an inoculant for cattle which is well tolerated by the animal.

A further object of this invention is to provide an inoculant for cattle which remains stable under refrigerated storage.

A further object of this invention is to provide an inoculant for cattle which has a total volume small enough in size so that it can be readily administered.

A further object of this invention is to provide an inoculant for cattle which permits the dosage to be varied somewhat by extremes in different sized cattle.

A further object of this invention is to provide an inoculant for cattle which insures that the animal will readily adjust to its new surroundings and thereby go on feed more quickly.

A further object of this invention is to provide an inoculant for cattle which under many disease conditions insures that the animal will have a higher weight gain per day.

A further object of this invention is to provide an inoculant for cattle which reduces and almost eliminates the need for treatment of the animals for respiratory infections after they have been moved and are in the feeding period.

A still further object of this invention is to provide an inoculant for cattle which is economical of manufacture.

A still further object of this inoculation is to provide a form of treatment for cattle infected with the respiratory disease complex and to limit the number of individual clinical cases of the disease in the herd.

These and other objects will be apparent to those skilled in the art.

The preferred ingredients of the inoculant is a mixture of a quantity of an injectable broad spectrum antibiotic, a quantity of an injectable corticosteroid, a quantity of an injectable antihistamine and a quantity of an injectable concentrated mixed bovine bacterin of the respiratory organisms or other like vaccine. This mixture is injected into the animal intramuscularly. A second inoculant, a modified live virus Infectious Bovine Rhinotracheitis vaccine may be injected simultaneously and if given, will enhance the broadness of the antigenicity to the respiratory complex, but because of the nature of the vaccine, it must be given separately in a different inoculation at this time and cannot be incorporated into the mixture. A combination of Infectious Bovine Rhinotracheitis vaccine and Leptospira Pomona Bacterin can also be used simultaneously.

The antibiotic to be used in this inoculant is a broad spectrum antibiotic that respiratory organisms show sensitivity to, such as penicillin, dyhdrostreptomycin, neomycin, terramycin and/or other injectable broad spectrum antibiotics. The preferred corticosteroid is a prednisolene derivative such as Azium injectable. The chemical name for Azium is dexamethasone which is 9-alpha-fluoro-16-alpha methylprednisolone. It is a white, odorless compound, slightly soluble in water, and melts at 240 to 260 degrees centigrade with decomposition. The preferred antihistamine is of the ordinary type which serves to retard shock such as Pyrilamine Maleate. The preferred concentrated mixed bovine bacterin should have a concentration of at least eight billion organisms to a cubic centimeter. It is desirable that the most potent antigenic agent that is available be used to provide a wide range of antibodies to the various bacteria responsible for the respiratory complex of disease in the bovine. A suitable bacterin would be an inactivated culture of 50% *Pasteurella multocida* types 1, 11 and 111, 30% Corynebacteria, 10% Streptococcus, 5% *Staphylococcus albus* and 5% *Staphylococcus aureus*.

The permissible range of the proportions of the various ingredients of the final mixture may be varied somewhat because of:

(1) Different antibiotics have different therapeutic dosage and concentrations in solution, (2) Different corticosteroids and prednisolone derivatives vary in their anti-inflammatory action and their recommended dosages and also vary in their milligrams of concentration in solution, (3) Different antihistamines vary in their dosage and concentrations in solution, (4) Mixed bovine concentrated bacterin might vary in the way the cultures are inactivated and this could affect the antigenicity of the product, (5) All proportions may be varied somewhat depending on the size and state of health of the animal.

While it has been found that various ingredients and various ranges of these ingredients are possible in the inoculant, Tables I and II below list the preferred ingredients and the preferred amounts thereof which will provide the greatest amount of protection for an average size animal. Any variation from the preferred amounts of the ingredients will cause a reduction in the amount of protection afforded to the animal and for that reason it is recommended that the preferred amounts listed in Tables I and II be utilized, however, variations in the preferred amounts will still provide protection but to a lesser degree than that achieved by the preferred amounts.

TABLE I

| Ingredient | Permissible range by volume of total solution (cc.) | Preferred amount by volume of total solution (cc.) |
|---|---|---|
| Antibiotic (penicillin) | 50–20.0 | 5.0 |
| Corticosteroid (axium injectable) | 2.5–10.0 | 2.5 |
| Antihistamine (pyrilamine maleate) | 0.5–3.0 | 0.5 |
| Concentrated mixed bovine bacterin (inactivated culture of 50% Pasteurella multocida types I, II and III, 30% Corynebacteria, 10% Streptococcus 5% Staphylococcus albus and 5% Staphylococcus aureus) | 10–4.0 | 2.0 |
| Total volume | | 10 |

TABLE II

| Ingredient | Permissible range by weight of total solution (gm.) | Preferred amount by weight of total solution (gm.) |
|---|---|---|
| Antibiotic (penicillin) | 6.0–24.0 | 6.0 |
| Corticosteroid (axium injectable) | 3.0–12.0 | 3.0 |
| Antihistamine (pyrilamine maleate) | 1.0–6.0 | 1.0 |
| Concentrated mixed bovine bacterin (inactivated culture of 50% Pasteurella multocida types I, II and III, 30% Corynebacteria, 10% Streptococus, 5% Staphylococcus albus and 5% Staphylococcus aureus) | 2.2–4.4 | 2.2 |
| Total weight | | 12.2 |

The inoculation has many advantages, some of which are as follows. The antibiotic destroys bacterial infection that the animal may be incubating or the sub-clinical infection that the animal might be harboring due primarily to movement, stress and exposure. The corticosteroids overcome stress of movement and exposure, enhance the action of the antibiotic and help overcome inflammation created by disease progresses. It is also believed that the corticosteroids enhance the antigenicity of the bacterin and modified live virus vaccine. The antihistamine aids in overcoming histamine and blocking the release of the histamine by the tissue cells damaged by needle trauma and antibiotic sensitivity. The bacterin stimulates the body cells to produce antibodies. It is also believed that the combination of the other ingredients in the mixture serves a purpose in setting up the animal body to produce more antibody production and more immunity to the specific bacterin and its range of organisms that produce their specific immunity. It serves the same function for the Rhinotracheitis vaccine and eliminates the usual added stress associated with any inoculation. The simultaneous use of the Infectious Bovine Rhinotracheitis vaccine helps build more antibodies to the respiratory viral complex. It is believed that there is a definite synergism in the inoculant mixture; for example, the antihistamine dosage of this inoculant is small as compared to recommended dosages for shock, however this mixture is injected exactly where the needle trauma takes place and has been found to successfully prevent shock.

The inoculant can be administered at one time and as suggested before, immediately after movement and exposure appears to be the optimum time for best results from a disease control standpoint. A single injection has many advantages when compared to four injections, namely: (1) One sight of contamination as compared to four; (2) One opportunity to inject directly into a blood vessel as compared to four, if a blood vessel is hit with said inoculant, the drug mixture is right there to reduce the adverse effects thereof; (3) A saving of time and labor; (4) Reduces the opportunity for dosage mistakes; and (5) The delay of absorption of one or other of the drugs at four separate sites will reduce the immediate synergism of the drugs. The total volume of the inoculation is small enough in size that it can be readily administered and does not require individual restraint of the animal. The components of the mixture readily mix chemically and must only be shaken thoroughly before use. The inoculation is well tolerated by the animal. The dosage can be varied somewhat by extremes in size of calves to 1,000 pound feeders. The mixture remains very stable under refrigerated storage.

This inoculation has been designed for use on feeder cattle of all ages moving from the range, or through the sale rings into the feed lots or into different grazing areas. It was designed to overcome a respiratory complex of infections that cattle become exposed to during this movement period and during their feeding or grazing periods thereafter. The optimum time of inoculation is just prior to turning the cattle out after they have been moved and exposed to the respiratory disease complex, but on the other hand can be used at any time during the feeding and grazing period when one or more of the advantages of the inoculation would be warranted, such as an acute herd respiratory infection. In conjunction with the inoculation of the above mixture, it is desired that the Infectious Bovine Rhinotracheitis vaccine be simultaneously administered. This vaccine cannot be incorporated into the mixture because it is a modified live virus and the inactivator in the bovine bacterin would destroy the modified live virus vaccine. This vaccine is sinergistic to the inoculation mixture because of its antigenicity to the respiratory viral complex.

The cattle moving into the feed lots are inoculated with this product and they appear to:

(1) Go on feed faster and more even because of less disease and infection, (2) because the cattle go on feed more evenly, there is less laminitis or founder, (3) tend to gain more pounds per day through the feeding period, (4) Require fewer individual treatments for respiratory disease of all kinds throughout the feeding period, and (5) Require less labor sorting out the sick animals for treatment, particularly during the critical first three weeks of starting on feed.

It is desired that the total volume of the inoculation mixture be limited to 10 cubic centimeters as a matter of convenience of injection by the operator. This speeds the operation and makes the use of automatic syringes possible. The dosage may be reduced to 5 cubic centimeters for calves.

The mixture has gained wide acceptance and usage. It has had a day-to-day observation of results and has cut herd death loss to a minimum. The mixture has proven itself through the inoculation of about 600,000 head of feeder and grass cattle under various types of shipping conditions and other circumstances, including acute active respiratory infections.

Thus, from the foregoing it can be seen that the invention accomplishes at least all of its stated objectives.

Some changes may be made in the construction and arrangement of my Inoculant for Cattle or the Like without departing from the real spirit and purpose of my invention, and it is my intention to cover by my claims, any modified forms of structure or use of mechanical equivalents which may be reasonably included within their scope.

I claim:

1. In an inoculant for cattle, 6 to 24 parts of an antibiotic substance, 3 to 12 parts of a corticosteroid substance, 1 to 6 parts of an antihistamine substance, and 2.2 to 4.4 parts of a concentrated mixed bovine bacterin substance, said antibiotic substance consisting of one of penicillin, dyhdrostreptomycin, neomycin and terramycin, said corticosteroid substance consisting of an anti inflamatory prednisolone derivative, said antihistamine substance consisting of pyrilamine maleate, said concentrated mixed bovine bacterin substance consisting of an inactivated culture of 50% *Pasteurella multocida* types I, II and III, 30% Corynebacteria, 10% Streptococcus, 5% *Staphylococcus albus* and 5% *Staphylococcus aureus*.

References Cited

Jones, Veterinary Pharmacology and Therapeutics, 3d ed., published by Iowa State University Press, Ames, Iowa, 1965, pp. 560 and 561.

Merck Index, 7th ed., published by Merck and Co., Inc., Rahway, N.J., 1960, p. 848.

Merck Veterinary Manual, 2d ed. published by Merck and Co., Inc. Rahway, N.J., 1961, pp. 280–282, and 1563.

Veterinary Bulletin (I), vol. 28, entry 345, 1958, citing Carter Vet. Med. 52, 254–255, 1057.

Veterinary Bulletin (II), vol. 32, entry 1357, 1962, citing Shamatava, Veterinariaya, Moscow, No. 9, pp. 70–73, 1961.

Yearbook of Agriculture 1942, Keeping Livestock Healthy, published by U.S. Department of Agriculture, pp. 530–531.

Yearbook of Agriculture 1956, Animal Diseases, published by U.S. Agriculture, p. 259.

RICHARD L. HUFF, *Primary Examiner.*

U.S. Cl. X.R.

424—181, 240, 271, 263